US012700528B2

United States Patent

(12) United States Patent
Terashima et al.

(10) Patent No.: US 12,700,528 B2
(45) Date of Patent: Aug. 4, 2026

(54) ELECTRICAL STEEL SHEET HAVING INSULATING COATING, METHOD FOR PRODUCING THE SAME, TRANSFORMER CORE AND TRANSFORMER USING THE ELECTRICAL STEEL SHEET, AND METHOD FOR REDUCING DIELECTRIC LOSS IN TRANSFORMER

(71) Applicant: JFE Steel Corporation, Tokyo (JP)

(72) Inventors: Takashi Terashima, Tokyo (JP); Karin Kokufu, Tokyo (JP); Makoto Watanabe, Tokyo (JP); Toshito Takamiya, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 970 days.

(21) Appl. No.: 17/056,847

(22) PCT Filed: May 20, 2019

(86) PCT No.: PCT/JP2019/019839
§ 371 (c)(1),
(2) Date: Nov. 19, 2020

(87) PCT Pub. No.: WO2019/230466
PCT Pub. Date: Dec. 5, 2019

(65) Prior Publication Data
US 2021/0202145 A1 Jul. 1, 2021

(30) Foreign Application Priority Data
May 30, 2018 (JP) ................................ 2018-103046

(51) Int. Cl.
*H01F 1/18* (2006.01)
*C23C 22/08* (2006.01)
(Continued)

(52) U.S. Cl.
CPC .............. *H01F 1/18* (2013.01); *C23C 22/08* (2013.01); *C23C 22/74* (2013.01); *H01F 27/245* (2013.01)

(58) Field of Classification Search
None
See application file for complete search history.

(56) References Cited

U.S. PATENT DOCUMENTS 3,856,568 A 12/1974 Tanaka et al.
3,985,583 A 10/1976 Shimanaka et al.
(Continued)

FOREIGN PATENT DOCUMENTS

CN 104025207 A 9/2014
CN 105051255 A 11/2015
(Continued)

OTHER PUBLICATIONS

Russian Office Action for Russian Application No. 2020139167, dated Apr. 21, 2021, with translation, 14 pages.
(Continued)

*Primary Examiner* — Samir Shah
(74) *Attorney, Agent, or Firm* — Buchanan Ingersoll & Rooney PC

(57) ABSTRACT

An electrical steel sheet having an insulating coating is provided. The electrical steel sheet is capable of reducing dielectric loss in a transformer in a case where the electrical steel sheet is used in a transformer core.

An electrical steel sheet having an insulating coating, the insulating coating being disposed on at least one of surfaces of the electrical steel sheet, the insulating coating having a relative dielectric constant at 1000 Hz of less than or equal to 15.0 and a dielectric loss tangent at 1000 Hz of less than or equal to 20.0.

7 Claims, 2 Drawing Sheets

(51) Int. Cl.

| | |
|---|---|
| ***C23C 22/74*** | (2006.01) |
| *H01F 27/245* | (2006.01) |

(56) References Cited

U.S. PATENT DOCUMENTS

| | | | | | |
|---|---|---|---|---|---|
| 4,238,534 | A * | 12/1980 | Ichida | C23C 22/74 148/261 |
| 2003/0077448 | A1 * | 4/2003 | Ueta | H01F 41/0246 428/404 |
| 2003/0207035 | A1 * | 11/2003 | Schmid | B32B 15/08 427/318 |
| 2011/0058976 | A1 | 3/2011 | Guempel et al. | |
| 2012/0013430 | A1 | 1/2012 | Morishige et al. | |
| 2013/0167982 | A1 * | 7/2013 | Yamaguchi | C22C 38/001 148/525 |
| 2014/0377573 | A1 * | 12/2014 | Okubo | C22C 38/001 148/111 |
| 2015/0368158 | A1 | 12/2015 | Lemaître et al. | |
| 2017/0313887 | A1 * | 11/2017 | Kwon | C21D 8/1233 |

FOREIGN PATENT DOCUMENTS

| | | | |
|---|---|---|---|
| CN | 105980584 | A | 9/2016 |
| DE | 102008023059 | A1 | 2/2010 |
| EP | 2180082 | A1 | 4/2010 |
| EP | 2800103 | A1 | 11/2014 |
| EP | 2902509 | A1 | 8/2015 |
| EP | 3219825 | A1 | 9/2017 |
| EP | 3272906 | A1 | 1/2018 |
| JP | 4839338 | A | 6/1973 |
| JP | 5079442 | A | 6/1975 |
| JP | 01129736 | A | 5/1989 |
| JP | 0382772 | A | 4/1991 |
| JP | 0867913 | A | 3/1996 |
| JP | 11187626 | A | 7/1999 |
| JP | 2000164435 | A | 6/2000 |
| JP | 2017054997 | A | 3/2017 |
| RU | 2496167 | C1 | 10/2013 |
| WO | 2010110217 | A1 | 9/2010 |
| WO | 2016059827 | A1 | 4/2016 |

OTHER PUBLICATIONS

Korean Office Action for Korean Application No. 10-2020-7033279, dated Nov. 2, 2022 with Concise Statement of Relevance of Office Action, 8 pages.

European Communication pursuant to Article 94(3) for European Application No. 19811553.7, dated Sep. 16, 2022, 7 pages.

Canadian Examination Report for Canadian Application No. 3,097,333, dated Dec. 30, 2021, 6 pages.

Chinese Office Action with Search Report for Chinese Application No. 201980036435.2, dated Sep. 9, 2021, 9 pages.

Extended European Search Report for European Application No. 19811553.7, dated May 6, 2021, 9 pages.

International Search Report and Written Opinion for International Application No. PCT/JP2019/019839, dated Jul. 30, 2019, 4 pages.

Chen et al., "A Method for the Fabrication of Monodisperse Hollow Silica Spheres", Advanced Materials, 2006, vol. 18 pp. 801-806.

Canadian Examination Report for Canadian Application No. 3,097,333, dated Aug. 2, 2022, 5 pages.

European Communication pursuant to Article 94(3) for European Application No. 19811553.7, dated Nov. 15, 2023, 6 pages.

* cited by examiner

ELECTRICAL STEEL SHEET HAVING INSULATING COATING, METHOD FOR PRODUCING THE SAME, TRANSFORMER CORE AND TRANSFORMER USING THE ELECTRICAL STEEL SHEET, AND METHOD FOR REDUCING DIELECTRIC LOSS IN TRANSFORMER

CROSS REFERENCE TO RELATED APPLICATIONS

This is the U.S. National Phase application of PCT/JP2019/019839, filed May 20, 2019, which claims priority to Japanese Patent Application No. 2018-103046, filed May 30, 2018, the disclosures of these applications being incorporated herein by reference in their entireties for all purposes.

FIELD OF THE INVENTION

The present invention relates to an electrical steel sheet having an insulating coating, a method for producing the same, a transformer core and a transformer using the electrical steel sheet, and a method for reducing dielectric loss in a transformer. Particularly, the present invention relates to an electrical steel sheet including an insulating coating that has excellent dielectric properties, that is, an insulating coating that has a low dielectric loss. In particular, the present invention relates to a grain-oriented electrical steel sheet having such an insulating coating.

BACKGROUND OF THE INVENTION

Electrical steel sheets are soft magnetic materials widely utilized as a material for the iron cores of rotary machines and static devices. In particular, grain-oriented electrical steel sheets are soft magnetic materials used as a material for the iron cores of transformers and power generators and have a crystalline texture in which the <001> orientation, which is an axis of easy magnetization of iron, is highly aligned along the rolling direction of the steel sheet. Such a texture is formed through the secondary recrystallization, which occurs in secondary recrystallization annealing in a process of producing a grain-oriented electrical steel and in which grains having the (110) [001] orientation, which is the so-called Goss orientation, are preferentially grown to form ultra-large grains.

Typically, grain-oriented electrical steel sheets are provided with an insulating coating that includes two layers, namely, a coating layer and an insulating coating layer. The coating layer includes forsterite as a principal constituent and is disposed on the side that is in contact with the steel sheet. The insulating coating layer includes silicophosphate glass as a principal constituent. The silicophosphate glass coating layer is included to provide insulating properties, workability, rust preventing properties, and the like. Since glass has low adhesion to metal, it is common to form, between the glass coating layer and the steel sheet, a ceramic coating layer that includes forsterite as a principal constituent. These coating layers are formed at high temperatures and have a lower coefficient of thermal expansion than the steel sheet, and, therefore, when the temperature is reduced to room temperature, tension is imparted to the steel sheet because of the difference in the coefficient of thermal expansion between the steel sheet and the insulating coating, and, consequently, an effect of reducing iron loss is produced. For example, as disclosed in Patent Literature 1, which describes a tension of 8 MPa or greater, it is desired that a tension as high as possible be imparted to steel sheets. To satisfy such a requirement, various glass coatings have been proposed in the related art. For example, Patent Literature 2 proposes a coating that includes, as principal constituents, magnesium phosphate, colloidal silica, and chromic anhydride, and Patent Literature 3 proposes a coating that includes, as principal constituents, aluminum phosphate, colloidal silica, and chromic anhydride.

Transformer cores, which are a principal application for grain-oriented electrical steel sheets, are formed of laminated multiple pieces of a steel sheet. When a core is excited, an induced current is generated within the steel sheet, and the current causes Joule heat, which constitutes a loss. In general, this is called an eddy current loss. To reduce the eddy current loss, grain-oriented electrical steel sheets having a very small thickness, namely, a thickness of less than or equal to 0.30 mm, or in some cases, less than or equal to 0.20 mm, are used. The coating on a surface of the steel sheet is required to have high insulating properties because if current flows between the laminated layers of the steel sheet, the effect of the reduced thickness of the steel sheet becomes useless. The state in which pieces of a steel sheet, which is a conductor, and insulators (insulating coatings) formed on the surfaces of the pieces of the steel sheet are laminated in multiple layers can be regarded as a type of capacitor. The capacitance of each of the layers is at a substantially negligible level, but, in a large transformer, since the number of layers is very large, the transformer as a whole has a considerable capacitance, and, thus, the electrostatic energy that is to be stored in the transformer is large. The electrostatic energy stored in the transformer is eventually released as thermal energy, and, therefore, dielectric loss (hereinafter also referred to as "dielectric-loss") occurs, which results in energy loss.

The loss is manifested as a degradation of a building factor [the ratio between an actual loss (iron loss) in a transformer and a loss (iron loss) in the material (an electrical steel sheet that forms the core of the transformer). To avoid this, a process is sometimes performed for partially removing the insulation of the laminated pieces of the steel sheet. However, such a process increases the eddy current loss, and, therefore, it is preferable to refrain from performing such a process as much as possible. Accordingly, the present inventors conducted studies for avoiding the loss by appropriately controlling dielectric properties of the insulating coating. In the field of semiconductors, research and development studies of, for instance, low dielectric constant interlayer dielectrics (Low-k films) have been conducted, but, in the field of electrical steel sheets, there have been no inventions that have the same object as the present invention.

Patent Literature 4 is cited as disclosing an invention that utilizes dielectric properties of a coating. However, Patent Literature 4 discloses that a coating having a high dielectric loss is used to facilitate heat generation (loss) to thermally bond the laminated pieces of a steel sheet together. That is, it can be said that the invention disclosed in Patent Literature 4 is an invention based on a concept contrary to that of the present invention.

Furthermore, Patent Literature 5 and 6, for example, are cited as disclosing technologies that focus on dielectric properties of a component included in a transformer. However, the technologies disclosed in Patent Literature 5 and 6 are technologies for appropriately controlling the dielectric properties of an insulating member of a winding wire or a bobbin to improve the insulating properties thereof, and, therefore, the technologies are not intended to appropriately control the dielectric properties of a material for cores.

PATENT LITERATURE

PTL 1: Japanese Unexamined Patent Application Publication No. 8-67913
PTL 2: Japanese Unexamined Patent Application Publication No. 50-79442
PTL 3: Japanese Unexamined Patent Application Publication No. 48-39338
PTL 4: Japanese Unexamined Patent Application Publication No. 11-187626
PTL 5: International Publication No. 2016/059827
PTL 6: Japanese Unexamined Patent Application Publication No. 2000-164435

SUMMARY OF THE INVENTION

An object according to aspects of the present invention is to provide an electrical steel sheet having an insulating coating, the electrical steel sheet being capable of reducing dielectric loss in a transformer in a case where the electrical steel sheet is used as a material for a transformer core. Furthermore, other objects according to aspects of the present invention are to provide a method for producing the electrical steel sheet having an insulating coating, to provide a transformer core and a transformer using the electrical steel sheet having an insulating coating, and to provide a method for reducing dielectric loss in a transformer.

The present inventors began the studies by measuring dielectric properties of a grain-oriented electrical steel sheet produced by a method of the related art. A test piece was prepared in the following manner.

First, a piece having a size of 100 mm×100 mm was cut from a grain-oriented electrical steel sheet produced by a known method, which was a final-annealed electrical steel sheet and had a thickness of 0.23 mm. Then, an unreacted portion of an annealing separator was removed, and subsequently, stress relief annealing was performed (800° C., 2 hours, and $N_2$ atmosphere). As a result, a coating layer (forsterite coating layer) that included forsterite as a principal constituent was formed on a surface of the steel sheet. Light pickling was performed by using a 5 mass % aqueous phosphoric acid solution. Subsequently, a coating treatment liquid that was the same as that disclosed in Patent Literature 2 was applied to surfaces of the steel sheet having the forsterite coating layer, to form an insulating coating layer. Thus, an electrical steel sheet having an insulating coating was produced. Thereafter, pickling was performed to remove the insulating coating present on one of the surfaces of the steel sheet, and the resultant was used as the test piece. Specifically, corrosion-protection tape was applied to one surface (in its entirety) of the sample of the produced electrical steel sheet having an insulating coating, and subsequently, the steel sheet was immersed in a 25 mass % aqueous NaOH solution at 110° C. for approximately 10 minutes to remove the insulating coating present on the surface on the side that had no corrosion-protection tape applied thereto. The resultant was used as the test piece.

Electrodes were attached to the surface of the test piece on the side that had the insulating coating, and dielectric properties of the insulating coating were measured by using an LCR meter E4980A, manufactured by Keysight Technologies, Inc. The measurement was conducted at room temperature (26° C.) by using a capacitance method over a measurement frequency range of 50 Hz to 1 MHz. Note that a thickness of each of the layers of the insulating coating was as follows: the forsterite coating layer had a thickness of 2.0 μm, the silicophosphate insulating coating layer had a thickness of 2.0 μm, and the total was 4.0 μm.

A relative dielectric constant ($\varepsilon_r$) and a dielectric loss tangent (tan δ) of the insulating coating as measured are shown in FIG. 1 and FIG. 2, respectively. The variation in the measured value was large at low frequencies, but, at 1000 Hz, the variation in the measured value was small and at a substantially negligible level. Accordingly, a decision was made that the dielectric properties of the material were to be evaluated by using the relative dielectric constant at 1000 Hz and the dielectric loss tangent at 1000 Hz. Note that for the samples of grain-oriented electrical steel sheets that had no insulating coating layer and had only the forsterite coating layer, dielectric properties could not be measured because the insulation of the coating could not be maintained.

It was found that the dielectric properties of an insulating coating could be measured in the manner described above. Next, the present inventors diligently performed studies for a method for controlling the dielectric properties of the insulating coating. As a result, it was found that the dielectric properties of the insulating coating could be controlled by incorporating, into the insulating coating layer that is included in the insulating coating, a paraelectric material or hollow ceramic particles.

An exemplary electrical steel sheet having an insulating coating was produced in the following manner: 5 mass % of nano-hollow silica Thrulya, manufactured by JGC Catalysts and Chemicals Ltd., was added to a coating treatment liquid that was the same as that disclosed in Patent Literature 2; and then, as described above, the coating treatment liquid was applied to both surfaces of a steel sheet having a forsterite coating layer, to form an insulating coating layer. Subsequently, pickling was performed, and thus, a sample in which the insulating coating on one of the surfaces of the steel sheet was removed was prepared. The dielectric properties of the insulating coating of the sample were measured by using the same method as described above. The results are shown in FIG. 3 and FIG. 4. It is apparent that the insulating coating that included the nano-hollow silica had a lower relative dielectric constant and a lower dielectric loss tangent than the insulating coating obtained according to the method of the related art (Patent Literature 2), across the entire range of 50 Hz to 1 MHz.

Furthermore, it was found that in a case where such an electrical steel sheet having an insulating coating that had a low relative dielectric constant and a low dielectric loss tangent was used as a material for the core of a large transformer, dielectric loss was reduced, and, therefore, an effect of remedying the loss in transformers was produced. Accordingly, aspects of the present invention were completed.

Specifically, aspects of the present invention have the following constitutions.

[1] An electrical steel sheet having an insulating coating, the insulating coating being disposed on at least one of surfaces of the electrical steel sheet, the insulating coating having a relative dielectric constant at 1000 Hz of less than or equal to 15.0 and a dielectric loss tangent at 1000 Hz of less than or equal to 20.0.

[2] The electrical steel sheet having an insulating coating according to [1], wherein the insulating coating includes an insulating coating layer that includes hollow ceramic particles.

[3] The electrical steel sheet having an insulating coating according to [1], wherein the insulating coating includes an insulating coating layer that includes a low-dielectric-loss material, the low-dielectric-loss material having a dielectric loss coefficient at 1 MHz of less than or equal to 0.10.

[4] A method for producing the electrical steel sheet having an insulating coating according to [2], the method including using a treatment liquid for forming the insulating coating layer, the treatment liquid including the hollow ceramic particles; applying the treatment liquid to a surface of an electrical steel sheet or a surface of an electrical steel sheet having a forsterite coating layer; and performing a baking process.

[5] A method for producing the electrical steel sheet having an insulating coating according to [3], the method including using a treatment liquid for forming the insulating coating layer, the treatment liquid including the low-dielectric-loss material; applying the treatment liquid to a surface of an electrical steel sheet or a surface of an electrical steel sheet having a forsterite coating layer; and performing a baking process.

[6] A method for producing the electrical steel sheet having an insulating coating according to [3], the method including using a treatment liquid for forming the insulating coating layer, the treatment liquid being a liquid from which the low-dielectric-loss material precipitates; applying the treatment liquid to a surface of an electrical steel sheet or a surface of an electrical steel sheet having a forsterite coating layer; performing a baking process; and thereafter, performing a crystallization process to cause the low-dielectric-loss material to precipitate in the insulating coating layer, the crystallization process including performing heating at a temperature higher than or equal to 1050° C. for at least 30 seconds.

[7] A transformer core in which the electrical steel sheet having an insulating coating according to any one of [1] to [3] is used.

[8] A transformer including the transformer core according to [7].

[9] A method for reducing dielectric loss in a transformer, the method including constructing a core of the transformer by laminating pieces of an electrical steel sheet having an insulating coating, the insulating coating being disposed on at least one of surfaces of the electrical steel sheet, the insulating coating having a relative dielectric constant at 1000 Hz of less than or equal to 15.0 and a dielectric loss tangent at 1000 Hz of less than or equal to 20.0.

[10] The method for reducing dielectric loss in a transformer according to [9], wherein the insulating coating includes an insulating coating layer that includes hollow ceramic particles.

[11] The method for reducing dielectric loss in a transformer according to [9], wherein the insulating coating includes an insulating coating layer that includes a low-dielectric-loss material, the low-dielectric-loss material having a dielectric loss coefficient at 1 MHz of less than or equal to 0.10.

According to aspects of the present invention, an electrical steel sheet having an insulating coating is provided, the electrical steel sheet having an excellent effect in reducing dielectric loss in a transformer in a case where the electrical steel sheet is used as a material for a transformer core. According to aspects of the present invention, an electrical steel sheet including an insulating coating that has a low relative dielectric constant and a low dielectric loss tangent is provided to address the problem of dielectric loss, which is a problem that arises in a case where a transformer core is formed by laminating pieces of an electrical steel sheet; with the use of such an electrical steel sheet, dielectric loss in a transformer can be reduced, and the building factor can be reduced.

In the related art, the disadvantage of an increase in dielectric loss due to an increase in capacitance in laminated pieces of a steel sheet, which is prominent particularly in a large transformer, has been addressed by using a means associated with the production or designing of a transformer or a transformer core. In accordance with aspects of the present invention, dielectric properties of an insulating coating formed on a surface of an electrical steel sheet that is to form a transformer core are appropriately controlled, and, accordingly, an increase in dielectric loss due to an increase in capacitance that may result from the lamination of pieces of the electrical steel sheet is inhibited without using a particular means associated with the production or designing of a transformer or a transformer core; consequently, productivity for transformers and transformer cores is improved.

DETAILED DESCRIPTION OF EMBODIMENTS OF THE INVENTION

Figure 1:
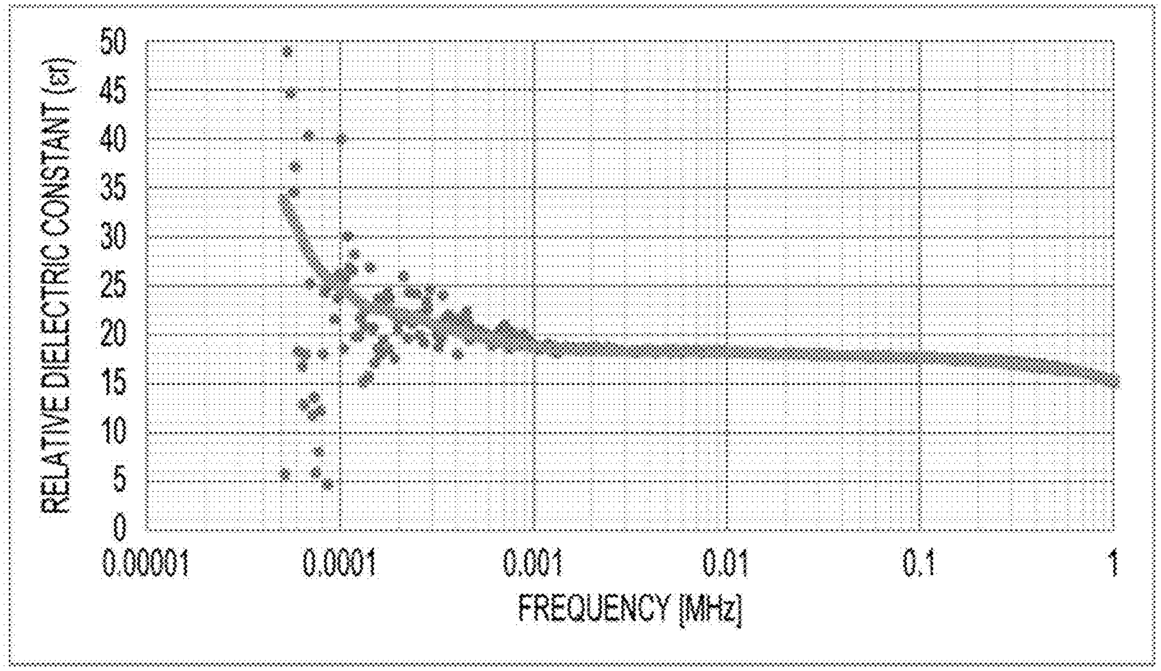
FIG. 1 is a graph illustrating a dielectric property (a frequency dependence of a relative dielectric constant) of an insulating coating of an example of the related art.
Figure 2:
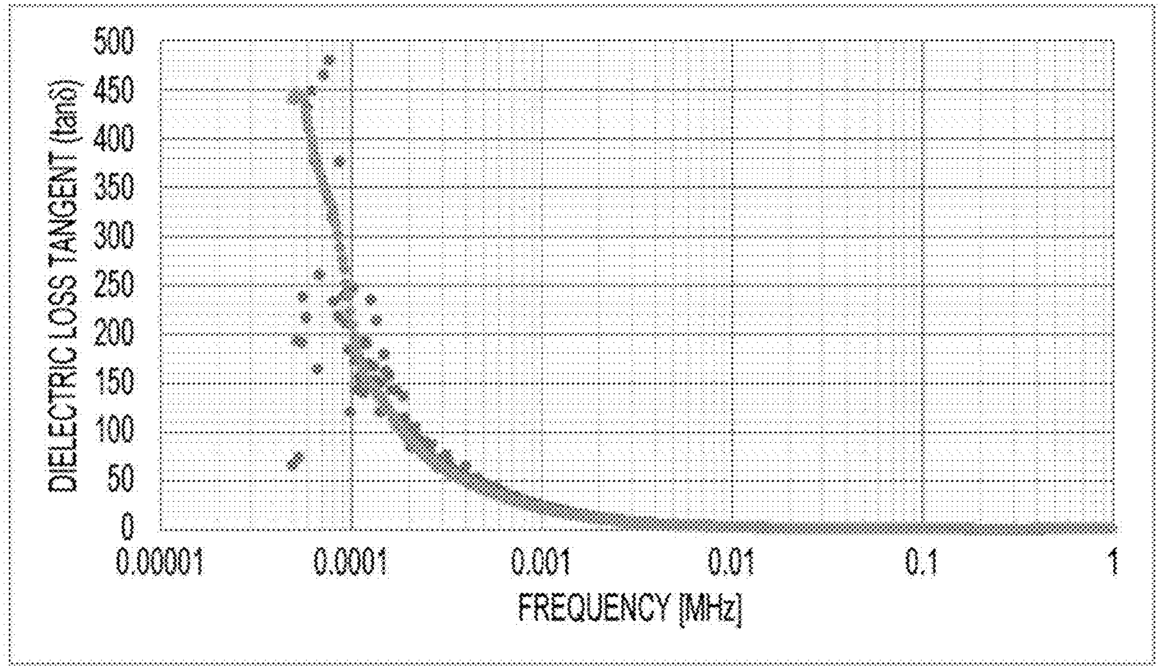
FIG. 2 is a graph illustrating a dielectric property (a frequency dependence of a dielectric loss tangent) of the insulating coating of the example of the related art.
Figure 3:
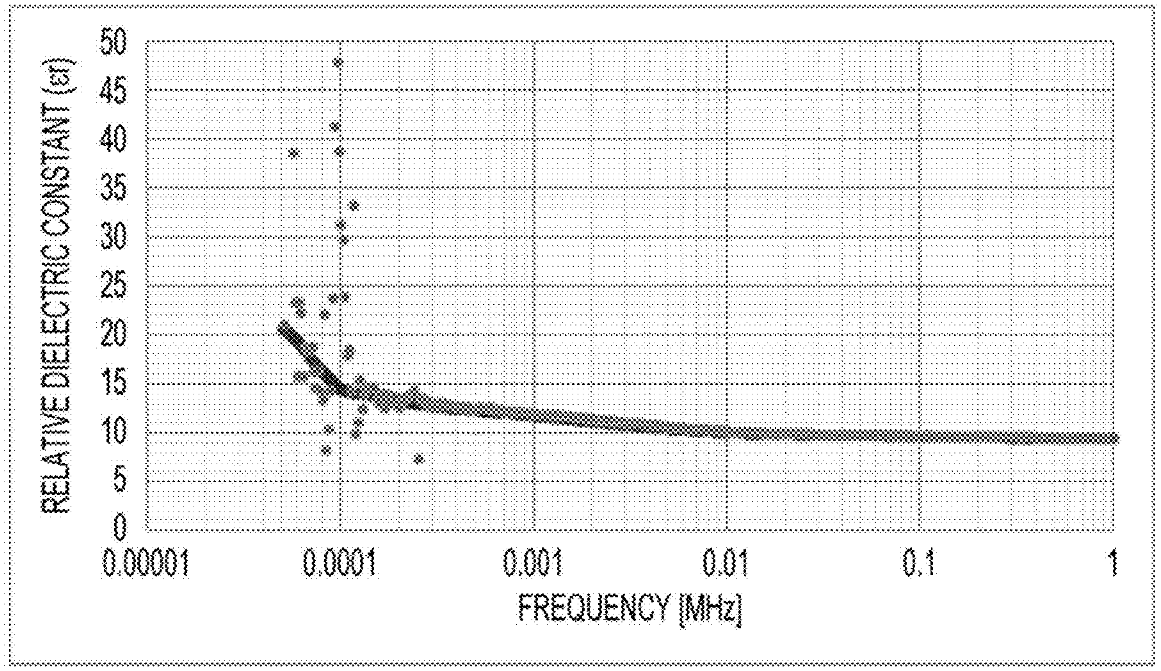
FIG. 3 is a graph illustrating a dielectric property (a frequency dependence of a relative dielectric constant) of an insulating coating of an example of the present invention.
Figure 4:
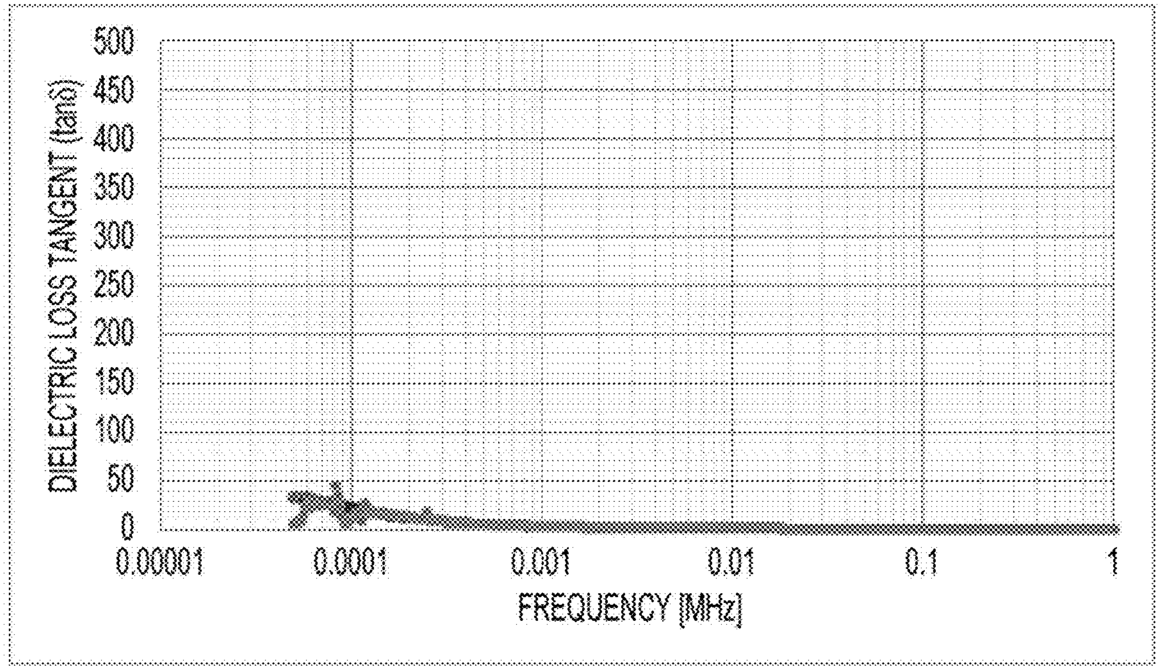
FIG. 4 is a graph illustrating a dielectric property (a frequency dependence of a dielectric loss tangent) of the insulating coating of the example of the present invention.

Each of the constitutional requirements according to aspects of the present invention will now be described.

The electrical steel sheet used in accordance with aspects of the present invention is not particularly limited, and, for example, an electrical steel sheet produced by a known method may be used. Examples of preferred electrical steel sheets that may be used include a grain-oriented electrical steel sheet produced by a method such as that described below, for example.

First, a preferred chemical composition of the steel will be described. In the following description, the unit "%" used for the contents of the elements means "mass %" unless otherwise specified.

C: 0.001 to 0.10%

C is a component useful for the formation of Goss-oriented grains. To enable such a function to be exhibited effectively, C may be included in an amount greater than or equal to 0.001%. On the other hand, if a C content is greater than 0.10%, poor decarburization may occur in decarburization annealing. Accordingly, it is preferable that the C content be within a range of 0.001 to 0.10%.

Si: 1.0 to 5.0%

Si is a component effective for increasing electrical resistance to reduce iron loss and for stabilizing the BCC structure of iron to enable a high-temperature heat treatment.

It is preferable that a Si content be greater than or equal to 1.0%. If the Si content is greater than 5.0%, however, it is difficult to perform usual cold rolling. Accordingly, it is preferable that the Si content be within a range of 1.0 to 5.0%. It is more preferable that the Si content be within a range of 2.0 to 5.0%.

Mn: 0.01 to 1.0%

Mn effectively contributes to remedying the hot shortness of steel and, in addition, serves as an inhibitor against the grain growth by forming a precipitate such as MnS or MnSe in a case where S or Se exists. It is, therefore, preferable that a Mn content be greater than or equal to 0.018. On the other hand, if the Mn content is greater than 1.0%, a grain diameter of a precipitate such as MnSe may become coarsened, and, consequently, the effect of serving as an inhibitor may be lost. Accordingly, it is preferable that the Mn content be within a range of 0.01 to 1.0%.

sol. Al: 0.003 to 0.050%

Al is a useful component because, in steel, Al forms AlN, which serves as a dispersed second phase and thus functions as an inhibitor. It is, therefore, preferable that sol. Al be included in an amount greater than or equal to 0.003%. On the other hand, if an Al content, in terms of sol. Al, is greater than 0.050%, AlN may form coarse precipitates, and, consequently, the function of serving as an inhibitor may be lost. Accordingly, it is preferable that the Al content, in terms of sol. Al, be within a range of 0.003 to 0.050%.

N: 0.001 to 0.020%

Similar to Al, N is a useful component because N forms AlN. It is, therefore, preferable that N be included in an amount greater than or equal to 0.001%. On the other hand, if N is included in an amount greater than 0.020%, blistering or the like may occur during the heating of a slab. Accordingly, it is preferable that a N content be within a range of 0.001 to 0.020%.

Total Content of One or More Selected from S and Se: 0.001 to 0.05%

S and Se are useful components because S or Se binds to Mn or Cu to form MnSe, MnS, $Cu_2$-xSe, or $Cu_2$-xS, which serves as a dispersed second phase in steel and thus functions as an inhibitor. To achieve a useful addition effect, it is preferable to ensure that a total content of S and Se be greater than or equal to 0.001%. On the other hand, if the total content of S and Se is greater than 0.058, the solid solution thereof during the heating of a slab may be incomplete, and, in addition, a surface defect of a product may be caused. Accordingly, whether one of S and Se is included or both S and Se are included, it is preferable that the total content of S and Se be within a range of 0.001 to 0.05%.

It is preferable that the basic components of the steel be as stated above. Furthermore, in the composition, the balance, other than the components described above, may be Fe and incidental impurities.

Furthermore, the chemical composition described above may further include one or more selected from Cu: 0.01 to 0.2%, Ni: 0.01 to 0.5%, Cr: 0.01 to 0.5%, Sb: 0.01 to 0.1%, Sn: 0.01 to 0.5%, Mo: 0.01 to 0.5%, and Bi: 0.001 to 0.1%. Including an element that has a function of serving as an auxiliary inhibitor enables a further improvement in magnetic properties. Among such elements are the elements mentioned above, which tend to segregate at grain diameters or a surface. Each of the elements produces a useful effect when included in an amount greater than or equal to the lower limit of the content mentioned above. If the content is greater than the upper limit of the above-mentioned content, the coating appearance tends to be poor, and a secondary recrystallization failure tends to occur. Accordingly, the above-mentioned ranges are preferable.

Furthermore, the chemical composition described above may additionally include one or more selected from B: 0.001 to 0.01%, Ge: 0.001 to 0.1%, As: 0.005 to 0.1%, P: 0.005 to 0.1%, Te: 0.005 to 0.1%, Nb: 0.005 to 0.1%, Ti: 0.005 to 0.18, and V: 0.005 to 0.1%. Including one or more of these results in an enhanced ability to inhibit the grain growth, which in turn results in consistent achievement of higher magnetic flux densities.

A preferred method for producing an electrical steel sheet having an insulating coating will now be described.

Molten steel having a chemical composition as described above is prepared by using a refining process known in the art, and then the molten steel is processed by using a continuous casting method or an ingot casting-slabbing rolling method to form a steel starting material (steel slab). Subsequently, the steel slab is hot-rolled to form a hot-rolled sheet, which may be subjected to hot band annealing if necessary. The resultant is then subjected to cold rolling once, or twice or more with intervening intermediate annealing, to form a cold-rolled sheet having a final sheet thickness. Next, primary recrystallization annealing and decarburization annealing are performed. Subsequently, an annealing separator containing MgO as a principal component is applied, and then final annealing is performed to form a coating layer that includes forsterite as a principal constituent. Subsequently, a coating treatment liquid for forming a glass insulating coating layer is applied, and then flattening annealing in which baking can also be accomplished is performed. Thus, by using such a production method including a series of the steps, the electrical steel sheet having an insulating coating can be produced.

The insulating coating according to aspects of the present invention may be formed of one insulating coating layer or two or more coating layers. In the case where two or more coating layers are included, it is preferable that a forsterite coating layer be formed adjacent to the base steel sheet, and an insulating coating layer be formed adjacent to an outer surface of the forsterite coating layer. Forming a forsterite coating layer is preferable in terms of ensuring adhesion between the base steel and a glass or glass-ceramic insulating coating layer that is formed adjacent to an outer surface of the forsterite coating layer. In addition, forsterite itself is a paraelectric material, that is, a material having a low relative dielectric constant and a low dielectric loss, and, therefore, forming a forsterite coating layer is preferable in terms of obtaining an insulating coating having desired dielectric properties.

The insulating coating layer is formed for electrical insulating properties and to impart tension to the steel sheet. Preferably, the insulating coating layer is glass or glass-ceramic. Typically, the insulating coating layer to be formed is a phosphate salt-based insulating coating layer. This is because phosphate salt-based insulating coating layers have low-temperature baking properties and can be applied by using a coating treatment liquid formulated as an aqueous solution. From the standpoint of production cost, it is preferable that the insulating coating layer be formed of a single layer. However, to impart properties such as a low frictional coefficient and high thermal resistance, additional one or more coating layers may be formed.

When the dielectric properties of the insulating coating are to be measured, the properties of the coating layers including all the coating layers, that is, for example, in a case where the insulating coating is formed of a forsterite coating layer and an insulating coating layer, the coating layers including the forsterite coating layer and the insulating coating layer, are to be measured. The dielectric properties can be measured by using a capacitance method. Since transformers are excited at a frequency of 50 to 60 Hz, properties at low frequencies are important. However, as indicated by the measurement results shown in FIG. 1 and the like, measurement errors are significant at low frequencies, and, therefore, in accordance with aspects of the present invention, measured values at 1000 Hz, where measurement errors are reduced, are employed. There is a correlation between material properties at low frequencies and material properties at 1000 Hz, and, therefore, the values at 1000 Hz, where measurement accuracy can be sufficiently ensured, are employed in accordance with aspects of the present invention.

If a relative dielectric constant ($\varepsilon_r$), which is a dielectric property of the insulating coating, increases excessively, the capacitance increases. As a result, in a case where a transformer core is formed, a problem arises in that, for instance, an excessive pulse current occurs due to an increase in dielectric loss, blocking of the current flow, or the like in the transformer. Accordingly, the relative dielectric constant ($\varepsilon_r$) at 1000 Hz of the insulating coating is to be less than or equal to 15.0. It is preferable that the relative dielectric constant be less than or equal to 12.0. Although the lower limit of the relative dielectric constant at 1000 Hz of the insulating coating is not particularly limited, a feasible range of the relative dielectric constant is greater than or equal to 1.0.

Furthermore, if a dielectric loss tangent (tan δ) of the insulating coating increases, the dielectric loss also increases as indicated by equation (1) below. Accordingly, the dielectric loss tangent (tan δ) at 1000 Hz of the insulating coating is to be less than or equal to 20.0. It is preferable that the dielectric loss tangent be less than or equal to 10.0.

The dielectric loss, P, is determined as follows:

$$P=f\varepsilon_r C_0 V^2 \tan\delta \quad (1)$$

where f is the frequency, $C_0$ is the vacuum capacitance, and V is the voltage.

A thickness of the insulating coating is measured by examining a cross section of the steel sheet by SEM. Being thinner is advantageous from the standpoint of dielectric loss, but, if it is too thin, the insulating properties are degraded. Accordingly, the thickness of the insulating coating is preferably greater than or equal to 2.0 μm and more preferably greater than or equal to 3.0 μm. On the other hand, if the insulating coating is too thick, the insulating properties increase, which is preferable, but the dielectric loss increases, and a lamination factor deteriorates. Accordingly, the thickness of the insulating coating is preferably less than or equal to 6.0 μm and more preferably less than or equal to 5.0 μm.

A principal constituent of the insulating coating layer may be a nitride, a sulfide, an oxide, an inorganic material, or an organic material. Any of these may be used provided that electrical insulating properties of the material are guaranteed. However, in view of stress relief annealing, the use at normal pressure and in the atmosphere, and the like, an oxide is preferable, and it is particularly preferable that the principal constituent be an inorganic oxide.

The inorganic oxide may be a phosphate salt, a borate salt, a silicate salt, or the like. It is preferable to use silicophosphate glass, which is currently commonly utilized as a principal constituent of the components of insulating coating layers. Silicophosphate glass has a property of absorbing moisture in the atmosphere. To prevent this from occurring, one or more elements selected from Mg, Al, Ca, Ti, Nd, Mo, Cr, Ba, Cu, and Mn may be included, preferably.

Methods for obtaining the insulating coating having the dielectric properties according to aspects of the present invention include, for instance, a method in which hollow ceramic particles are incorporated into the insulating coating layer, which is included in the insulating coating, and a method in which a material having a low dielectric loss (hereinafter also referred to as a "low-dielectric-loss material"), such as a paraelectric material, is incorporated into the insulating coating layer.

With the hollow ceramic particles, the dielectric properties of the insulating coating can be controlled by utilizing an air layer of the hollow ceramic particles. Examples of the hollow ceramic particles include hollow silica particles.

Examples of the low-dielectric-loss material include aluminum oxide ($Al_2O_3$), magnesium oxide (MgO), forsterite ($Mg_2SiO_4$), barium magnesium niobate ($Ba(Mg_{1/3}Nb_{2/3})O_3$), barium neodymium titanate ($BagNd_{9.3}Ti_{18}O_{54}$), and diopside ($CaMgSi_2O_6$). Note that the low-dielectric-loss material as referred to herein is a material having a dielectric loss coefficient ($\varepsilon_r$ tan δ) at 1 MHz of less than or equal to 0.10. It is more preferable that the dielectric loss coefficient at 1 MHz be less than or equal to 0.05.

A method for incorporating hollow ceramic particles into the insulating coating layer may be as follows, for example. A coating treatment liquid in which hollow ceramic particles are added to a known treatment liquid for forming an insulating coating layer (coating treatment liquid) is prepared. That is, in the method, a coating treatment liquid including hollow ceramic particles is used; the coating treatment liquid is applied to a surface of a base steel (electrical steel sheet), an electrical steel sheet having a forsterite coating layer on a surface thereof, or the like, and then a baking process is performed to form an insulating coating layer including hollow ceramic particles. Note that in accordance with aspects of the present invention, the baking process may be a process in which heating is performed, for example, at a temperature of 800° C. to 1000° C. for 10 seconds to 120 seconds.

Furthermore, a method for incorporating a low-dielectric-loss material into the insulating coating layer may be as follows, for example. As with the above method, a coating treatment liquid in which a low-dielectric-loss material is added to a known coating treatment liquid is prepared. That is, in the method, a coating treatment liquid including a low-dielectric-loss material is used; the coating treatment liquid is applied to a surface of a base steel (an electrical steel sheet), an electrical steel sheet having a forsterite coating layer on a surface thereof, or the like, and then a baking process is performed to form an insulating coating layer including a low-dielectric-loss material.

Specifically, the coating treatment liquid may be, for example, a coating treatment liquid that includes at least one selected from phosphate salts of Mg, Ca, Ba, Sr, Zn, Al, Mn, or Co and includes colloidal silica and the hollow ceramic particles and/or a low-dielectric-loss material.

An average particle diameter of the hollow ceramic particles that are to be present in the insulating coating layer is not particularly limited. It is preferable that the average particle diameter be greater than or equal to 20 nm, from the standpoint of reducing dielectric loss in the coating more efficiently. Furthermore, from the standpoint of a surface roughness of the coating, it is preferable that the average particle diameter of the hollow ceramic particles be less than or equal to 1000 nm. More preferably, the average particle diameter is less than or equal to 500 nm.

It is necessary that the low-dielectric-loss material be present as a solid (crystalline phase) in the insulating coating layer. An average particle diameter of the low-dielectric-loss material that is to be present in the insulating coating layer is not particularly limited. From the standpoint of the surface roughness of the coating, it is preferable that the average particle diameter be less than or equal to 1000 nm. More preferably, the average particle diameter is less than or equal to 500 nm. Furthermore, smaller particle diameters result in lower dielectric loss tangents (i.e., lower dielectric losses) of the formed insulating coating although reasons for this are unclear. Accordingly, it is more preferable that the average particle diameter be less than or equal to 100 nm. On the other hand, if the average particle diameter is too small, it is difficult to maintain the dispersion in the coating treatment liquid. Accordingly, it is preferable that the average particle diameter be greater than or equal to 5 nm.

Note that the average particle diameter of the hollow ceramic particles and the average particle diameter of the low-dielectric-loss material can be determined by examining the dispersed particles or material with a TEM (transmission electron microscope) and using the obtained photograph. Specifically, from the image of the obtained photograph, a projected area of the particles or the material is measured to determine a circle-equivalent diameter thereof. Next, the arithmetic mean of the determined circle-equivalent diameters of one hundred of the particles or one hundred pieces of the material is determined. The arithmetic mean is used as the average particle diameter (average primary particle diameter) of the particles or the material.

Furthermore, the hollow ceramic particles or low-dielectric-loss material having an average particle diameter such as those described above may be a commercially available product. Examples of the hollow ceramic particles include Thrulya 1110 (hollow silica, average particle diameter of 50 nm), manufactured by JGC Catalysts and Chemicals Ltd. Furthermore, examples of the low-dielectric-loss material include Biral Al—C20 ($Al_2O_3$ sol, average particle diameter of 15 to 20 nm), manufactured by Taki Chemical Co., Ltd., a "high purity & ultrafine single crystal magnesia powder" 500 A (magnesium oxide, average particle diameter of 45 to 60 nm), manufactured by Ube Material Industries, Ltd., and a "high purity & ultrafine single crystal magnesia powder" 2000 A (magnesium oxide, average particle diameter of 190 to 240 nm), manufactured by Ube Material Industries, Ltd.

However, for example, aluminum oxide and magnesium oxide are highly reactive with phosphoric acid and, therefore, may react with phosphoric acid and thus disappear or dissolve in the baking process for the insulating coating layer, and, consequently, the crystallized state may not be maintained. Accordingly, in a case where a material reactive with phosphoric acid, such as aluminum oxide or magnesium oxide, is used as the low-dielectric-loss material, it is preferable that the material be in a low-reactivity state.

Such aluminum oxide or magnesium oxide that is in a low-reactivity state with respect to phosphoric acid may preferably be those in which the particles have a definite crystalline form. That is, those in which the particles are not amorphous are preferable. Furthermore, those in which are in an ultrafine particle state, with the average particle diameter being less than or equal to 100 nm, are particularly preferable. Examples thereof include Biral Al—C20, manufactured by Taki Chemical Co., Ltd., and the "high purity & ultrafine single crystal magnesia powder" 500 A, manufactured by Ube Material Industries, Ltd., mentioned above. Biral Al—C20 is a high-thermal-resistance alumina sol, that is, a low-reactivity alumina sol, that contains ultrafine particles with an average particle diameter of 15 to 20 nm. Furthermore, the "high purity & ultrafine single crystal magnesia powder" 500 A includes fine particles that are in a form close to the form of a single crystal and have an average particle diameter of 45 to 60 nm.

Another method for incorporating a low-dielectric-loss material into the insulating coating layer may be a method in which fine precipitates of a low-dielectric-loss material are formed in the insulating coating layer by utilizing the crystallization of glass (this method is hereinafter also referred to as a precipitation method). In this case, the insulating coating layer has a form of glass ceramics.

In the precipitation method, a coating treatment liquid from which a low-dielectric-loss material can precipitate is used; the treatment liquid is applied to a surface of an electrical steel sheet, an electrical steel sheet having a forsterite coating layer on a surface thereof, or the like, and then a baking process is performed; thereafter, a crystallization process is performed to cause the low-dielectric-loss material to precipitate in the insulating coating layer. That is, in the precipitation method, a glass insulating coating layer is first formed by baking the coating treatment liquid, and, thereafter, the crystal (crystalline phase) of a low-dielectric-loss material is caused to precipitate by performing a crystallization process. Examples of the crystalline phase of a low-dielectric-loss material include $MgTiO_3$, $Mg_2TiO_4$, $MgAl_2O_4$, $Nd_2Ti_2O_7$, and $CaMgSi_2O_6$. In this case, the initial composition of the coating treatment liquid for the precipitation of a suitable crystalline phase and the heat treatment conditions for crystallization need to be appropriately combined; however, the low-dielectric-loss material can be precipitated in a homogeneous and finely divided form in the insulating coating layer, and as a result, the properties are enhanced.

The coating treatment liquid to be used in the precipitation method may be, for example, a coating treatment liquid that includes at least one selected from phosphate salts of Mg, Ca, Ba, Sr, Zn, Al, Mn, or Co and includes colloidal silica and an optionally used additive.

For example, in a case where a crystal such as $MgTiO_3$ or $Nd_2Ti_2O_7$ is to be precipitated in the insulating coating layer, it is sufficient to use a coating treatment liquid in which a Ti- and/or Nd-containing compound such as titanium oxide and/or neodymium oxide, which can be a source of Ti and/or Nd, is used as the additive.

Furthermore, in a case where $CaMgSi_2O_6$ or the like is to be precipitated in the insulating coating layer, it is preferable to use a coating treatment liquid in which the content ratio between the phosphate salt and the colloidal silica in the coating treatment liquid is 50 to 250 parts by mass of the colloidal silica relative to 100 parts by mass of the phosphate salt, on a solids basis.

In the precipitation method, the baking process may be a process in which heating is performed, for example, at a temperature of 800° C. to 1000° C. for 10 seconds to 120 seconds. Furthermore, it is preferable that in the precipitation method, the crystallization process be a process in which heating is performed at a temperature higher than or equal to 1050° C. for at least 30 seconds.

The dielectric properties of the insulating coating can be controlled, for example, by adjusting a content of the hollow ceramic particles to be included in the insulating coating layer, a content of the low-dielectric-loss material to be included in the insulating coating layer, or an amount of the low-dielectric-loss material to be precipitated therein. Since different materials have different dielectric properties, it is desirable to conduct an experiment to determine the composition of the coating treatment liquid, the baking conditions, the crystallization process conditions, and the like.

EXAMPLES

Example 1

A silicon steel sheet slab containing, in mass %, C: 0.04%, Si: 3.25%, Mn: 0.08%, sol. Al: 0.015%, N: 0.006%, S: 0.002%, Cu: 0.05%, and Sb: 0.01% was heated at 1250° C. for 60 minutes and thereafter hot-rolled to form a hot-rolled sheet having a sheet thickness of 2.4 mm, which was then annealed at 1000° C. for 1 minute. Thereafter, the steel sheet was cold-rolled to a final sheet thickness of 0.27 mm. Subsequently, the steel sheet was heated from room temperature to 820° C. at a heating rate of 80° C./s, and thus, primary recrystallization annealing was carried out at 820° C. for 60 seconds in a wet atmosphere. Subsequently, an aqueous slurry of an annealing separator was prepared. The annealing separator contained 100 parts by mass of MgO and 3 parts by mass of $TiO_2$ mixed therewith. The aqueous slurry was applied and dried. The steel sheet was heated from 300° C. to 800° C. over a period of 100 hours and thereafter heated to 1200° C. at a rate of 50° C./hr. Furthermore, final annealing in which annealing took place at 1200° C. for 5 hours was carried out, and thus, a grain-oriented electrical steel sheet on which a forsterite coating layer was formed was prepared.

Next, coating treatment liquids as listed in Table 1 were prepared. The average particle diameters of the additives were determined by using a TEM (transmission electron microscope). Thrulya 1110 (average particle diameter: 50 nm), manufactured by JGC Catalysts and Chemicals Ltd., was used as hollow silica. Biral Al—C20 (average particle diameter: 15 nm), manufactured by Taki Chemical Co., Ltd., was used as an $Al_2O_3$ sol. A "high purity & ultrafine single crystal magnesia powder" 500 A (average particle diameter: 53 nm) or 2000 A (average particle diameter: 210 nm), manufactured by Ube Material Industries, Ltd., was used as magnesium oxide. Furthermore, Biral Al-L7 (average particle diameter: 8 nm), manufactured by Taki Chemical Co., Ltd., was used as an $Al_2O_3$ sol for a comparative material. Biral Al-L7 is a sol of amorphous $Al_2O_3$, which is highly reactive. Each of the coating treatment liquids was applied, by using a roll coater, to a surface of the grain-oriented electrical steel sheet on which a forsterite coating layer was formed. A coating weight per side of each of the insulating coating layers was 4.0 g/m$^2$ on the basis of the mass after baking. The baking atmosphere was 100% $N_2$, and soaking was performed at 900° C. for 30 seconds.

In the manner described above, grain-oriented electrical steel sheets having an insulating coating, in which an insulating coating layer was formed on a forsterite coating layer, were produced. Subsequently, the insulating coating on one of the surfaces of each of the steel sheets was removed by pickling, and thereafter, electrodes were attached to the surface of the steel sheet on the side having the insulating coating. The dielectric properties of the insulating coating were measured by using an LCR meter E4980A, manufactured by Keysight Technologies, Inc. The measurement was conducted at room temperature (26° C.) by using a capacitance method over a measurement frequency range of 50 Hz to 1 MHz. Thus, the relative dielectric constant at 1000 Hz and the dielectric loss tangent at 1000 Hz were determined. A thickness of the insulating coating was as follows: the forsterite coating layer had a thickness of 2.0 μm, the insulating coating layer had a thickness of 2.0 μm, and the total was 4.0 μm.

Furthermore, pieces of the obtained grain-oriented electrical steel sheet having an insulating coating were laminated to fabricate a core. A transformer incorporating the core and having a capacity of 30 MVA was fabricated, and a building factor (B. F.) was evaluated. Note that the building factor is a value obtained by dividing an iron loss value of the transformer by an iron loss value of the grain-oriented electrical steel sheet having an insulating coating, the electrical steel sheet being a material of the transformer core.

The results are shown in Table 1. As shown in Table 1, it is clear that grain-oriented electrical steel sheets having an insulating coating that had a relative dielectric constant at 1000 Hz of less than or equal to 15.0 and a dielectric loss tangent at 1000 Hz of less than or equal to 20.0 had an improved building factor. Specifically, all of the grain-oriented electrical steel sheets had a building factor improved by approximately 2% or greater even in comparison with the electrical steel sheets of Nos. 9 and 17, which had the lowest building factor among the grain-oriented electrical steel sheets of Comparative Examples. Hence, by constructing a transformer core by laminating pieces of a grain-oriented electrical steel sheet having an insulating coating that has a relative dielectric constant at 1000 Hz of less than or equal to 15.0 and a dielectric loss tangent at 1000 Hz of less than or equal to 20.0, the dielectric loss in a transformer can be reduced, and the building factor can be reduced.

TABLE 1

| | Coating treatment liquid | | | | | | | | Dielectric properties of insulating coating | | | |
|---|---|---|---|---|---|---|---|---|---|---|---|---|
| | Phosphate salt (g) (solids basis) | | | | | Colloidal | Additive | | Relative | Dielectric | | |
| No. | Mg phosphate | Ca phosphate | Al phosphate | Mn phosphate | Cr phosphate | silica (g) (solids basis) | Type | Addition amount (g) (solids basis) | dielectric constant*1 ($\varepsilon_r$) | loss tangent*2 (tanδ) | B.F. | Notes |
| 1 | 100 | — | — | — | — | 50 | — | — | 23.2 | 26.4 | 1.103 | Comparative example |
| 2 | 100 | — | — | — | — | 50 | Hollow silica | 2 | 19.5 | 23.5 | 1.102 | Comparative example |
| 3 | 100 | — | — | — | — | 50 | Hollow silica | 10 | 9.8 | 15.6 | 1.067 | Example |
| 4 | 100 | — | — | — | — | 50 | Hollow silica | 20 | 4.6 | 9.8 | 1.048 | Example |
| 5 | — | — | 100 | — | — | 50 | Hollow silica | 5 | 20.6 | 20.0 | 1.102 | Comparative example |

TABLE 1-continued

| | Coating treatment liquid | | | | | | | | Dielectric properties of insulating coating | | | |
|---|---|---|---|---|---|---|---|---|---|---|---|---|
| | Phosphate salt (g) (solids basis) | | | | | Colloidal | Additive | | | | | |
| No. | Mg phosphate | Ca phosphate | Al phosphate | Mn phosphate | Cr phosphate | silica (g) (solids basis) | Type | Addition amount (g) (solids basis) | Relative dielectric constant*[1] ($\varepsilon_r$) | Dielectric loss tangent*[2] ($\tan\delta$) | B.F. | Notes |
| 6 | — | — | 100 | — | — | 50 | $Al_2O_3$ sol (Biral Al-C20) | 10 | 15.0 | 20.0 | 1.078 | Example |
| 7 | — | — | 100 | — | — | 50 | $Al_2O_3$ sol (Biral Al-L7) | 10 | 25.4 | 28.4 | 1.108 | Comparative example |
| 8 | — | — | 100 | — | — | 50 | Magnesium oxide (Magnesia 500A) | 20 | 12.0 | 10.0 | 1.056 | Example |
| 9 | 50 | — | 50 | — | — | 70 | $Al_2O_3$ sol (Biral Al-C20) | 5 | 18.3 | 19.3 | 1.101 | Comparative example |
| 10 | — | — | — | — | 100 | 50 | $Al_2O_3$ sol (Biral Al-C20) | 20 | 11.6 | 9.7 | 1.055 | Example |
| 11 | — | 100 | — | — | — | 100 | Magnesium oxide (Magnesia 500A) | 15 | 14.8 | 9.8 | 1.066 | Example |
| 12 | — | 100 | — | — | — | 100 | Magnesium oxide (Magnesia 2000A) | 15 | 14.8 | 13.6 | 1.080 | Example |
| 13 | — | 50 | — | 50 | — | 150 | $Al_2O_3$ sol (Biral Al-C20) | 10 | 12.0 | 11.6 | 1.063 | Example |
| 14 | 50 | 40 | 10 | — | — | 120 | Magnesium oxide (Magnesia 500A) | 30 | 11.3 | 8.4 | 1.052 | Example |
| 15 | — | 50 | 50 | — | — | 80 | Magnesium oxide (Magnesia 500A) | 20 | 11.8 | 9.9 | 1.054 | Example |
| 16 | 80 | — | — | 20 | — | 80 | Hollow silica | 20 | 4.2 | 8.4 | 1.048 | Example |
| 17 | — | — | 50 | — | 50 | 80 | Hollow silica | 5 | 19.6 | 18.9 | 1.101 | Comparative example |

Underline indicates the value is outside of range of present invention
*[1]Relative dielectric constant at 1000 Hz
*[2]Dielectric loss tangent at 1000 Hz

Example 2

A silicon steel sheet slab containing, in mass %, C: 0.04%, Si: 3.25%, Mn: 0.08%, sol. Al: 0.015%, N: 0.006%, S: 0.002%, Cu: 0.05%, and Sb: 0.01% was heated at 1350° C. for 20 minutes and thereafter hot-rolled to form a hot-rolled sheet having a sheet thickness of 2.2 mm, which was then annealed at 1000° C. for 1 minute. Thereafter, the steel sheet was cold-rolled to a final sheet thickness of 0.23 mm. Subsequently, the steel sheet was heated from room temperature to 820° C. at a heating rate of 50° C./s, and thus, primary recrystallization annealing was carried out at 820° C. for 60 seconds in a wet atmosphere. Subsequently, an aqueous slurry of an annealing separator was prepared. The annealing separator contained 100 parts by mass of MgO and 3 parts by mass of $TiO_2$ mixed therewith. The aqueous slurry was applied and dried. The steel sheet was heated from 300° C. to 800° C. over a period of 100 hours and thereafter heated to 1200° C. at a rate of 50° C./hr. Furthermore, final annealing in which annealing took place at 1200° C. for 5 hours was carried out, and thus, a grain-oriented electrical steel sheet on which a forsterite coating layer was formed was prepared.

Next, coating treatment liquids as listed in Table 2 were prepared. The average particle diameters of the additives were determined by using a TEM. TKD-801 (average particle diameter: 6 nm), manufactured by Tayca Corporation, was used as a titanium oxide sol, and Biral Nd—C10 (average particle diameter: 5 nm), manufactured by Taki Chemical Co., Ltd., was used as a neodymium oxide sol. Each of the coating treatment liquids was applied, by using a roll coater, to a surface of the grain-oriented electrical steel sheet on which a forsterite coating layer was formed. The coating weight of each of the insulating coating layers is as shown in Table 2, with the mass after baking being varied. Note that the forsterite coating layer had a thickness of 2.0 μm. The first baking was performed at 700° C. for 60 seconds with the baking atmosphere being 100% $N_2$. Subsequently, the second baking, as a crystallization process, was performed under the conditions shown in Table 2. The crystalline phase that precipitated in the insulating coating layer was determined by X-ray diffraction analysis.

In the manner described above, grain-oriented electrical steel sheets having an insulating coating, in which an insulating coating layer was formed on a forsterite coating layer, were produced. Subsequently, the insulating coating on one of the surfaces of each of the steel sheets was removed by pickling, and thereafter, electrodes were attached to the surface of the steel sheet on the side having the insulating coating. The dielectric properties of the insulating coating were measured by using an LCR meter E4980A, manufactured by Keysight Technologies, Inc. The measurement was conducted at room temperature (26° C.) by using a capacitance method over a measurement frequency range of 50 Hz to 1 MHz. Thus, the relative dielectric constant at 1000 Hz and the dielectric loss tangent at 1000 Hz were determined.

Furthermore, pieces of the obtained grain-oriented electrical steel sheet having an insulating coating were laminated to fabricate a core. A transformer incorporating the core and having a capacity of 50 MVA was fabricated, and a building factor (B. F.) was evaluated.

The results are shown in Table 2. As shown in Table 2, it is clear that grain-oriented electrical steel sheets having an insulating coating that had a relative dielectric constant at 1000 Hz of less than or equal to 15.0 and a dielectric loss tangent at 1000 Hz of less than or equal to 20.0 had an improved building factor. Specifically, all of the grain-oriented electrical steel sheets had a building factor improved by 2% or greater even in comparison with the electrical steel sheet of No. 1, which had the lowest building factor among the grain-oriented electrical steel sheets of Comparative Examples. Hence, by constructing a transformer core by laminating pieces of a grain-oriented electrical steel sheet having an insulating coating that has a relative dielectric constant at 1000 Hz of less than or equal to 15.0 and a dielectric loss tangent at 1000 Hz of less than or equal to 20.0, the dielectric loss in a transformer can be reduced, and the building factor can be reduced.

surfaces of the electrical steel sheet, the insulating coating having a relative dielectric constant at 1000 Hz of less than or equal to 15.0 and a dielectric loss tangent at 1000 Hz of less than or equal to 20.0, wherein the insulating coating includes an insulating coating layer that includes a low-dielectric-loss material dispersed in the insulating coating layer, the low-dielectric-loss material having a dielectric loss coefficient at 1 MHz of less than or equal to 0.10, wherein the low-dielectric-loss material is present as a solid crystalline phase, and wherein the low-dielectric-loss material is selected from the group consisting of barium magnesium niobate ($Ba(Mg_{1/3}Nb_{2/3})O_3$), barium neodymium titanate ($Ba_4Nd_{9.3}Tl_{18}O_{54}$), diopside ($CaMgSi_2O_6$), $Mg_2TiO_4$, and $Nd_2Ti_2O_7$.

2. A method for producing the electrical steel sheet having the insulating coating according to claim 1, the method comprising:

using a treatment liquid for forming the insulating coating layer, the treatment liquid including the low-dielectric-loss material;

applying the treatment liquid to a surface of the electrical steel sheet or a surface of the electrical steel sheet having a forsterite coating layer; and performing a baking process.

TABLE 2

| No. | Coating treatment liquid: Phosphate salt (g) (solids basis): Mg phosphate | Ca phosphate | Al phosphate | Ba phosphate | Colloidal silica (g) (solids basis) | Additive (g) (solids basis): Titanium oxide sol | Neodymium oxide sol | Crystallization process conditions Process amperature (° C.) |
|---|---|---|---|---|---|---|---|---|
| 1 | 100 | — | — | — | 50 | — | — | — |
| 2 | 100 | — | — | — | 50 | 10 | | 1100 |
| 3 | 100 | — | — | — | 50 | 10 | 21 | 1050 |
| 4 | 100 | — | — | — | 50 | 10 | 21 | 1050 |
| 5 | — | — | 100 | — | 50 | 15 | 32 | 1050 |
| 6 | 40 | 40 | 20 | — | 200 | — | — | 1080 |
| 7 | 50 | — | — | 50 | 150 | 20 | — | 1050 |
| 8 | 50 | — | — | 50 | 120 | 5 | 10 | 1050 |

| No. | Crystallization process conditions Process time (min) | Insulating coating layer: Precipitated crystalline phase | Thickness (μm) | Dielectric properties of insulating coating: Relative dielectric constant*1 (Er) | Dielectric loss tangent*2 (tan) | B.F. | Note |
|---|---|---|---|---|---|---|---|
| 1 | — | None | 3.0 | 23.8 | 25.2 | 1.105 | Comparative example |
| 2 | 1 | $MgTiO_3$ | 5.0 | 14.8 | 19.7 | 1.082 | Example |
| 3 | 2 | $Nd_2Ti_2O_7$ | 4.0 | 13.8 | 15.6 | 1.067 | Example |
| 4 | 2 | $Nd_2Ti_2O_7$ | 6.0 | 13.5 | 14.9 | 1.055 | Example |
| 5 | 2 | $Nd_2Ti_2O_7$ | 2.0 | 12.1 | 12.5 | 1.050 | Example |
| 6 | 5 | $CaMgSi_2O_6$ | 3.0 | 14.6 | 12.3 | 1.066 | Example |
| 7 | 3 | $BaTiO_3$ | 4.0 | 350 | 12.6 | 1.122 | Comparative example |
| 8 | 2 | $Nd_2Ti_2O_7$ | 3.0 | 13.4 | 16.3 | 1.064 | Example |

Underline indicates the value is outside of range of present invention
Crystalization process was not performed on No. 1
*1 Relative dielectric constant at 1000 Hz
*2 Dielectric loss tangent at 1000 Hz

The invention claimed is:

1. An electrical steel sheet having an insulating coating, the insulating coating being disposed on at least one of

3. A method for producing the electrical steel sheet having the insulating coating according to claim 1, the method comprising:

using a treatment liquid for forming the insulating coating layer, the treatment liquid being a liquid from which the low-dielectric-loss material precipitates;

applying the treatment liquid to a surface of the electrical steel sheet or a surface of the electrical steel sheet having a forsterite coating layer;

performing a baking process; and thereafter, performing a crystallization process to cause the low-dielectric-loss material to precipitate in the insulating coating layer, the crystallization process including performing heating at a temperature higher than or equal to 1050° C. for at least 30 seconds.

4. A transformer core in which the electrical steel sheet having the insulating coating according to claim 1 is used.

5. A transformer comprising the transformer core according to claim 4.

6. A method for reducing dielectric loss in a transformer, the method comprising constructing a core of the transformer by laminating pieces of the electrical steel sheet having the insulating coating according to claim 1.

7. The electrical steel sheet according to claim 1, wherein the low-dielectric-loss material includes at least one selected from $Mg_2TiO_4$, $Nd_2Ti_2O_7$, and $CaMgSi_2O_6$.

* * * * *